United States Patent
Serra et al.

(10) Patent No.: US 8,676,534 B2
(45) Date of Patent: Mar. 18, 2014

(54) METHOD FOR DETERMINING THE ROTATION SPEED OF A SUPERCHARGER IN AN INTERNAL COMBUSTION ENGINE

(75) Inventors: Gabriele Serra, San Lazzaro di Savena (IT); Matteo De Cesare, Torremaggiore (IT); Federico Stola, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 361 days.

(21) Appl. No.: 13/151,709

(22) Filed: Jun. 2, 2011

(65) Prior Publication Data

US 2012/0010848 A1 Jan. 12, 2012

(30) Foreign Application Priority Data

Jun. 3, 2010 (IT) .............................. BO2010A0342

(51) Int. Cl.
*G06F 15/00* (2006.01)
*G01H 5/00* (2006.01)
(52) U.S. Cl.
USPC .............................. 702/151; 73/660; 701/114
(58) Field of Classification Search
USPC ........... 702/72, 75, 76, 98, 99, 103, 106, 130, 702/138, 145, 151, 183, 190, 191; 701/103, 701/114; 60/600, 602, 607, 608; 73/455, 73/660
See application file for complete search history.

(56) References Cited

U.S. PATENT DOCUMENTS

| | | | |
|---|---|---|---|
| 6,298,728 B1 | 10/2001 | Fekete et al. | |
| 2001/0022084 A1 | 9/2001 | Koelle et al. | |
| 2006/0064231 A1* | 3/2006 | Fekete et al. | ........... 701/114 |
| 2009/0223218 A1 | 9/2009 | Winsor et al. | |

FOREIGN PATENT DOCUMENTS

| | | |
|---|---|---|
| DE | 10007013 A1 | 8/2001 |
| DE | 102005032924 A1 | 1/2007 |
| EP | 0863404 A1 | 9/1998 |
| EP | 0952454 A1 | 10/1999 |
| EP | 2098701 A1 | 9/2009 |

* cited by examiner

*Primary Examiner* — John H Le
(74) *Attorney, Agent, or Firm* — Howard & Howard Attorneys PLLC

(57) ABSTRACT

A method for determining the rotation speed of at least one supercharger (14) in an internal combustion engine (1); the method includes detecting, through a microphone (25), the intensity of a sound signal generated by the rotation of the supercharger (14) and determining the evolution of the frequency content of the sound signal over time; determining, completely irrespective of the sound signal, a first estimation of the rotation speed of the supercharger (14) through which an interval of plausible frequencies for the rotation speed of the supercharger (14) may be determined; determining a second estimation of the rotation speed of the supercharger (14) according to the frequency content of the sound signal within the interval of plausible frequencies and validating the second estimation of the rotation speed of the supercharger (14) using the first estimation of the rotation speed of the supercharger (14).

24 Claims, 3 Drawing Sheets

US 8,676,534 B2

METHOD FOR DETERMINING THE ROTATION SPEED OF A SUPERCHARGER IN AN INTERNAL COMBUSTION ENGINE

CROSS-REFERENCE TO RELATED APPLICATION

This application claims priority under 35 U.S.C. §119 to Italian Patent Application No. BO2010A 000342, filed on Jun. 3, 2010 with the Italian Patent and Trademark Office, the disclosure of which is incorporated herein in its entirety by reference.

TECHNICAL FIELD

The present invention relates to a method for determining the rotation speed of at least one supercharger in an internal combustion engine.

PRIOR ART

A supercharged internal combustion engine is provided with a turbocharger (either a turbocharger operated by the exhaust gases or a volumetric turbocharger operated by the driving shaft) which, in some moments, compresses the sucked air in order to increase the volumetric efficiency. Due to the action of the turbocharger, in a supercharged internal combustion engine, either a slight vacuum determined by the suction action generated by the cylinders (turbocharger not running) or an overpressure determined by the compression action of the turbocharger (turbocharger running) may occur in the intake manifold plenum. Accordingly, in a supercharged internal combustion engine, being able to accurately control the rotation speed of a supercharger of the turbocharger which determines the overpressure in the intake manifold plenum is fundamental. The most known, used solution for determining the rotation speed of the supercharger included arranging a position sensor which reads the absolute angular position about a rotation axis of the supercharger and determines the angular rotation speed of the supercharger itself. The position sensor is normally fixed to a wall of a diffuser of the supercharger in a position facing and close to the blades.

This solution however has the disadvantage of ensuring non satisfactory performance in terms of reliability, and also requires mechanical machining operations on the supercharger which could be time and cost consuming.

DESCRIPTION OF THE INVENTION

It is the object of the present invention to provide a method for determining the rotation speed of a supercharger in an internal combustion engine, which method of determination is free from the drawbacks of the prior art, and in particular is easy and cost-effective to be implemented.

According to the present invention, a method for determining the rotation speed of a supercharger in an internal combustion engine is provided as claimed in the appended claims.

BRIEF DESCRIPTION OF THE DRAWINGS

The present invention will now be described with reference to the accompanying drawings, which illustrate a non-limitative embodiment thereof, in which.

PREFERRED EMBODIMENTS OF THE INVENTION

Figure 1:
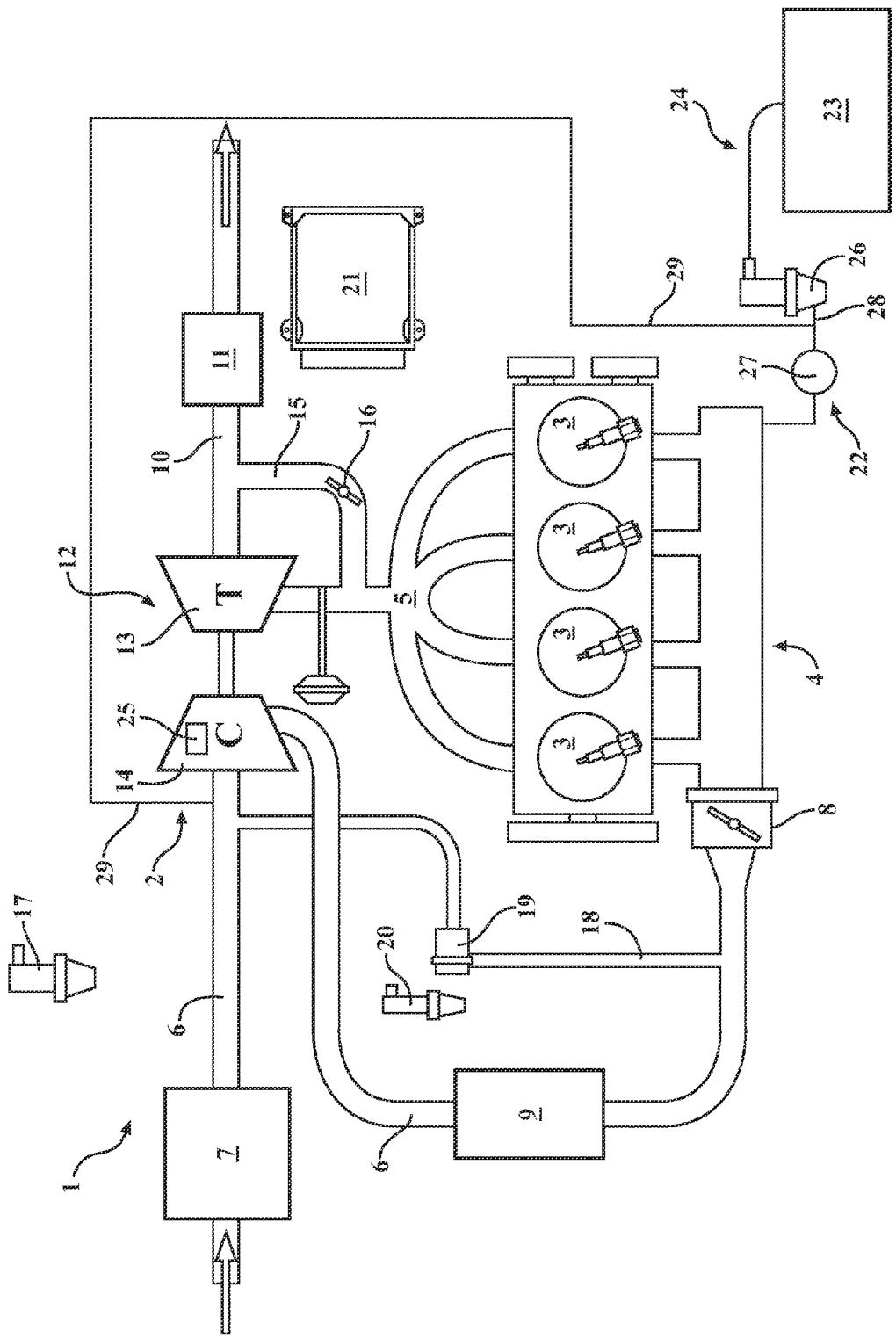
FIG. 1 is a diagrammatic view of a supercharged, internal combustion engine provided with a control unit which implements the method for determining the rotation speed of the supercharger object of the present invention.

In FIG. 1, numeral 1 indicates as a whole an internal combustion engine supercharged by a supercharging system 2 having a turbocharger.

The internal combustion engine 1 comprises four cylinders 3, each of which is connected to an intake manifold 4 by means of at least one respective intake valve (not shown), and to an exhaust manifold 5 by means of at least one respective exhaust valve (not shown). Intake manifold 4 receives fresh air (i.e. air from the external environment) through an intake conduit 6, which is provided with an air cleaner 7 and is adjusted by a butterfly valve 8. An intercooler 9 for cooling the sucked air is arranged along the intake conduit 6. An exhaust conduit 10, which feeds the exhaust gases produced by the combustion to an exhaust system, is connected to the exhaust manifold 5; the exhaust conduit emits the gases produced by the combustion into the atmosphere and normally comprises at least one catalytic converter 11 and at least one muffler (not shown) arranged downstream of the catalytic converter 11.

The supercharging system 2 of the internal combustion engine 1 comprises a turbocharger 12 provided with a turbine 13, which is arranged along the exhaust conduit 10 in order to rotate at high speed under the bias of the exhaust gases ejected from the cylinders 3, and a supercharger 14, which is arranged along the intake conduit 6 and is mechanically connected to turbine 13 in order to be rotationally fed, by the turbine 13 itself so as to increase the pressure of the air fed into the intake conduit 6.

Along the exhaust pipe 10 a bypass pipe 15 is provided, which is connected in parallel to turbine 13 so as to have its ends connected upstream and downstream of the turbine 13 itself; along the bypass pipe 15, a wastegate valve 16 is arranged, which is adapted to adjust the flow rate of the exhaust gases which flow through the bypass pipe 15 and is driven by an actuator 17. Along the intake pipe 6, a bypass pipe 18 is provided, which is connected in parallel to the supercharger 14 so as to have its ends connected upstream and downstream of the supercharger 14 itself; along the bypass pipe 18, a Poff valve 19 is arranged, which is adapted to adjust the air flow rate flowing through the bypass pipe 18 and is driven by an actuator 20.

The internal combustion engine 1 is controlled by an electronic control unit 21, which governs the operation of all the components of the internal combustion engine 1.

The internal combustion engine 1 further comprises a canister circuit 22, which serves the function of recovering the fuel vapors which are developed in a fuel tank 23 and of introducing these fuel vapors into cylinders 3 in order to be burnt; thereby prevents the fuel vapors which are developed in the fuel tank 23 are prevented from being released from the fuel tank 23 (in particular, when the fuel filler cap is opened for refueling) and being freely dispersed into the atmosphere.

As shown in FIG. 1, a control system 24 is provided which, in addition to the control unit 21, comprises at least one acoustic pressure level sensor 25, i.e. a microphone 25, which is connected to the control unit 21 and is adapted to detect the intensity S of the sound signal which detects the movement of supercharger 14.

Figure 2:
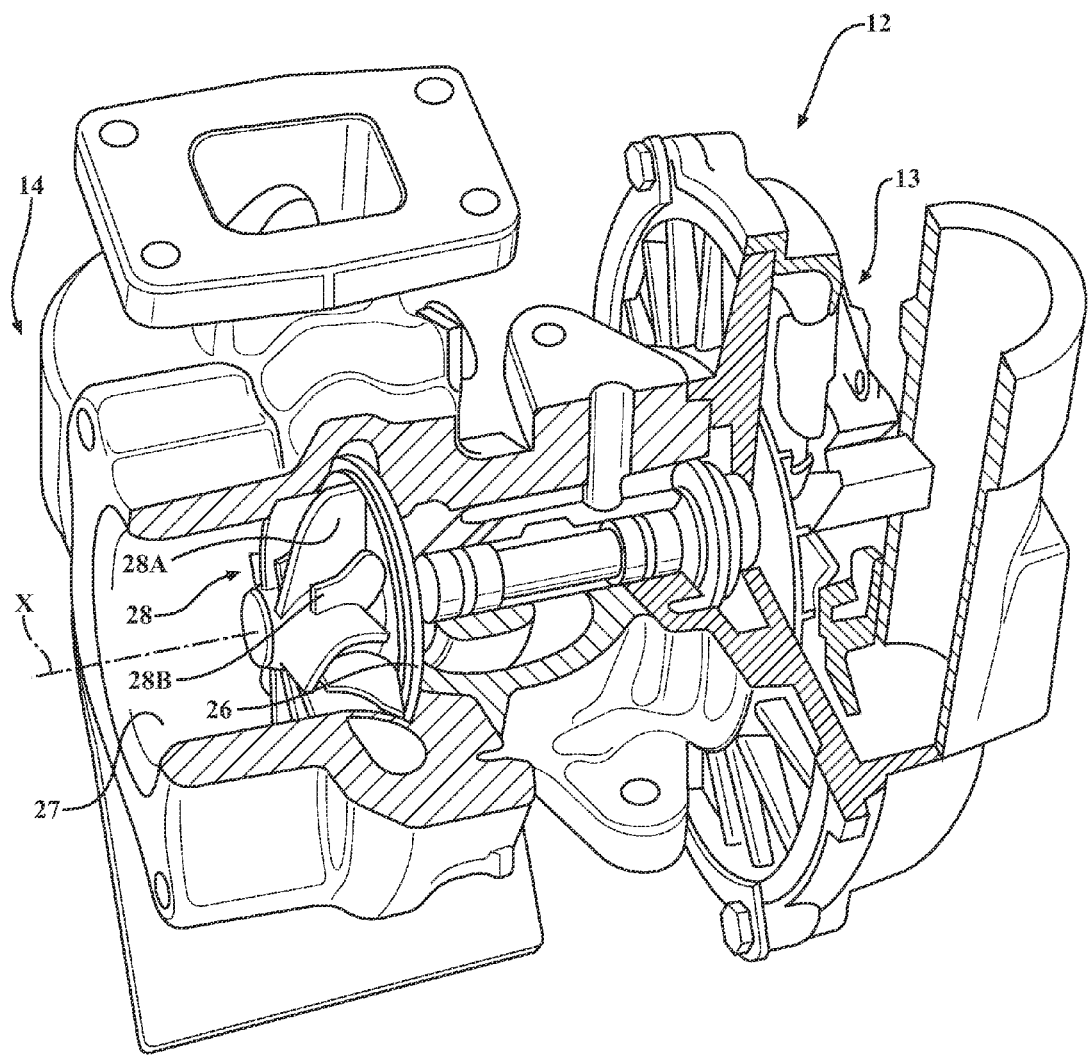
FIG. 2 is a diagrammatic view of a turbocharger of the internal combustion engine in FIG. 1.

As shown in greater detail in FIG. 2, supercharger 14 comprises a bladed disc 26 rotating about axis X and a fixed diffuser 27. Microphone 25 is arranged so as to detect the intensity S of the sound signal emitted by the rotation of blades 28 and in a shielded position so as to not be excessively affected by the noise produced by the horn, by the onset of detonation phenomena, etc.

The blades 28 are divided into a group of five blades 28A of longer length (so-called full blades) and a group of five blades 28B of shorter length (so-called splitter blades) alternating about axis X.

Microphone 25 is of the omnidirectional type and a relatively high frequency sampling, having a value in the magnitude order of 100 kHz, is used to acquire the intensity S of the sound signal.

Figure 4:
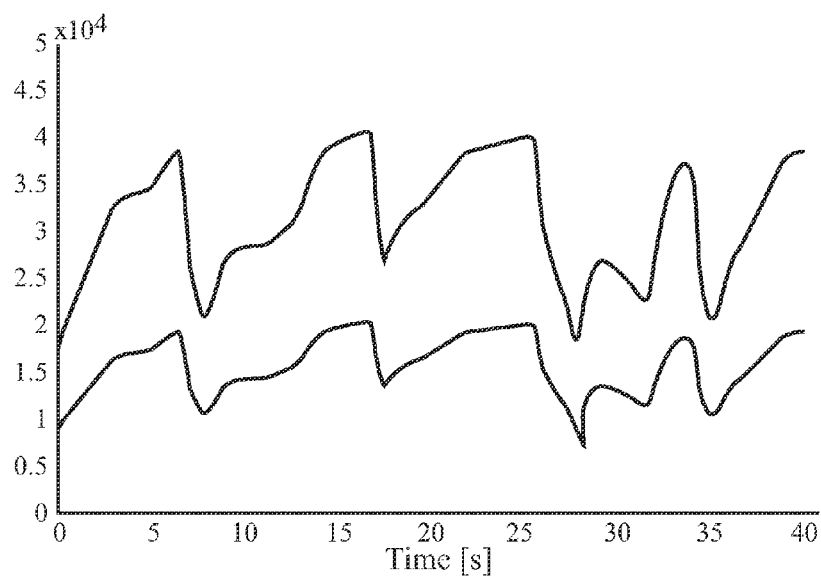
FIG. 4 is a chart which illustrates the FFT of the intensity of the sound signal generated by the rotation of the supercharger in FIG. 2.

FIG. 4 shows a chart, by way of example, which depicts the variation of the intensity S of the sound signal which detects the sound content of supercharger 14 as a function of time expressed in seconds.

The non-filtered signal which is acquired by microphone 25 is rich in information but difficult to be correlated to the rotation speed of supercharger 14. In order to obtain this information, a Fast Fourier Transform (FTT) should be operated to break down the obtained signal into a sum of harmonics with different frequencies, amplitudes and phases, as shown in the chart in FIG. 4. Of the higher amplitude frequencies of the full spectrum of the intensity S of the filtered sound signal, those related to the passage of various geometric irregularities of the bladed disc 26 within diffuser 27 are present. In particular, the detected geometric irregularities may relate to the single blades 28 forming the bladed disc 26 of supercharger 14, or irregularities of other type, such as for example, the presence of two groups of blades 28A and 28B of different length.

The chart in FIG. 4 shows two traces A and B corresponding to two multiples of the rotation frequency of supercharger 14, each of the two traces A and B being associated with a respective group of blades 28A and 28B of the bladed disc 26.

With the geometry of the bladed disc 26 being known, the rotation speed in [rpm] may be obtained by means of the following formula:

$$N=(60*f)/z$$

wherein:
f=instantaneous frequency [Hz];
z=number of blades 28 of supercharger 14 for each group of blades 28A and 28B;
N=rotation speed of supercharger 14 expressed in rpm.

The presence of traces A and B on the full spectrum of the intensity S of the filtered sound signal related to the single supercharger 14 is useful to improve the robustness of the signal recognition algorithm and/or to trace the speed of several supercharger assemblies in case of a multi-stage system.

With the speed information of supercharger 14 being known, the latter may be protected under overspeed conditions, when the safety system which cuts the input fuel of turbocharger 12 comes into operation, or the supercharging control may be improved by reducing the delay of turbocharger 12 in responding to actuation due to inertia of turbine 13.

The method then includes estimating a further value of the rotation speed of supercharger 14, completely irrespective of the intensity S of the filtered sound signal, to determine an interval of plausible frequencies of the rotation speed of supercharger 14.

The value of the rotation speed of supercharger 14 calculated in a completely irrespective manner is used to validate the value of the rotation speed of supercharger 14 estimated as a function of the frequency content of the intensity S of the filtered sound signal, again with reference to the interval of plausible frequencies.

Figure 3:
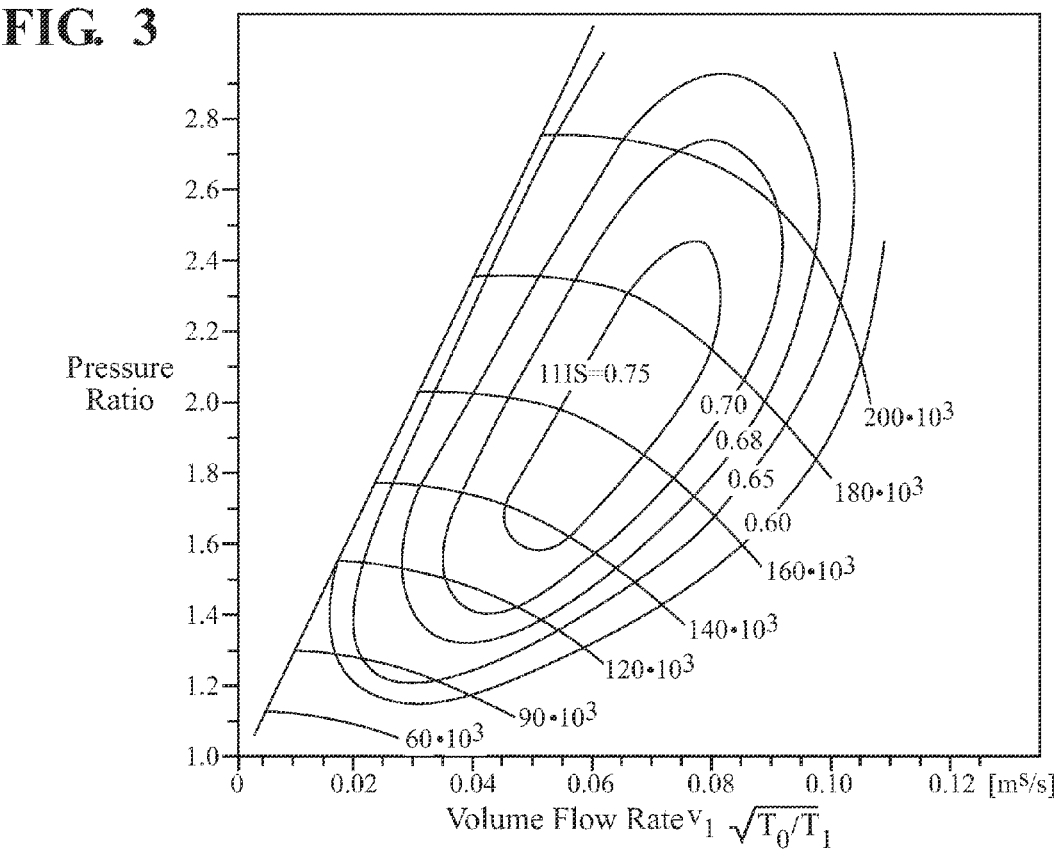
FIG. 3 shows the operation feature of the supercharger in FIG. 2.

A first method for estimating the rotation speed of supercharger 14 in a completely irrespective manner includes using a calibrated mathematical function from the operation feature of supercharger 14, provided by the manufacturer of supercharger 14 and shown in FIG. 3, which provides the rotation speed of supercharger 14 as a function of the compression ratio $\beta$ and the air flow rate $AM_{Compr}$ which passes through supercharger 14.

The estimation model thus expresses the rotation speed of supercharger 14 as a function of compression ratio $\beta$, flow rate $AM_{Compr}$ passing through supercharger 14, and intake and delivery temperatures.

In particular, the value N of the rotation speed of supercharger 14 may be expressed as follows:

$$N=f(\beta, AM_{Compr})$$

wherein:
$\beta$: compression ratio, i.e. the ratio between output pressure and input pressure of supercharger 14, respectively; and
$AM_{Compr}$: air flow passing through supercharger 14.

According to a preferred variant, with regards to the air flow rate $AM_{Compr}$ which passes through supercharger 14, this value is corrected by means of the air temperature $T_{air}$.

The input pressure value $P_{inC}$ of supercharger 14 is estimated as a function of the difference between the atmospheric pressure value $P_{atm}$ and the flow rate of air sucked in by the internal combustion engine 1 and detected by a flow meter (not shown).

The estimation model allows to obtain an estimation value of the rotation speed of supercharger 14 within an interval of plausible frequencies, from which the estimation of the rotation speed of supercharger 14 may be validated, which is obtained from the frequency content of the intensity S of the filtered sound signal within the interval of plausible frequencies.

Moreover, the operation feature provided by the manufacturer may be adapted on the basis of the supercharger 14 in use; in particular, the adaptation propagation occurs according to a predetermined mathematic law by means of a system of equations (which will not be described hereinafter), which are implemented by the electronic control unit 21 to propagate the learning and consolidate the operation feature map of supercharger 14.

In case of substantially high rotation speeds of supercharger 14, higher than a predetermined threshold value $TV_1$, the first estimation of the rotation speed of supercharger 14 provided by the frequency content of the intensity S of the filtered sound signal is reliable and used to adapt the operation feature of the supercharger shown in FIG. 3.

Instead, in case of low rotation speed of supercharger 14, lower than a predetermined threshold value $TV_1$, the first estimation of the rotation speed of supercharger 14 provided by the frequency content of the intensity S of the filtered sound signal is less reliable and therefore not used to adapt the operation feature of the supercharger shown in FIG. 3.

The model described hereto may be also advantageously applied as a diagnostic instrument of the microphone 25 to evaluate possible drifts due to the obsolescence of the microphone 25 itself. In this case, the model includes, in a preliminary set-up and design step, establishing an initial tolerance value (e.g. ±10%) acceptable at the beginning of the active life the microphone 25 for deviations between the two estimated values of the rotation speed of supercharger 14 and a full-rate tolerance value (e.g. ±20%), which is higher than the initial tolerance value to take into account the inevitable obsolescence of the microphone 25. If the deviation between the two estimated rotation speed values of supercharger 14 is higher than the initial or full-rate tolerance value, the electronic control unit 21 signals the onset of a fault condition of microphone 25.

A variant of the method described hereto includes the possibility of estimating the further value of the rotation speed of supercharger 14 completely irrespective of the intensity S of the filtered sound signal by means of an adaptive model, in order to make the estimation of the rotation speed of supercharger 14 more robust in the points where the intensity S of the sound signal is weaker or more disturbed by noise.

According to a first variant, the adaptive model is based on a mathematical formula with non-linear terms.

In particular, the speed of supercharger 14 is estimated by means of the following non-liner formula:

$$N = c2*(\beta - c1)^{c3} + (c4*\beta) + (c5*AM_{Compr}^{c6}) + (AM_{Compr}/\beta)^{c8}/c7$$

wherein:
$\beta$: compression ratio; and
$AM_{Compr}$ flow rate of air passing through supercharger 14;
and
$c1$-$c8$: characteristic coefficients of supercharger 14.

The initial value of the characteristic coefficients $c1$-$c8$ are identified in a preliminary set-up and design step, starting from the nominal operation feature provided by the manufacturer and/or are obtained from experimental off-vehicle engine data, and are afterwards adapted online for each supercharger 14.

The adaptive model includes leaving the characteristic coefficients $c3$, $c6$ and $c8$ unchanged during adaptation with respect to the nominal operation feature, while the characteristic coefficients $c1$, $c2$, $c4$, $c5$, $c7$ are updated.

In order to update the value of the five characteristic coefficients $c1$, $c2$, $c4$, $c5$, $c7$ a minimum number of five measuring points are obviously needed; the five measuring points are stored in a memory buffer within the electronic control unit 21. With the values of $\beta$, $N_{Compr}$ and N being known, a system of equations may be obtained, by means of which the updated values of the characteristic coefficients $c1$, $c2$, $c4$, $c5$, $c7$ are obtained.

The resolution of the non-linear system is possible by taking advantage of the simplification of the above-mentioned non-linear formula which is obtained for medium-low flow rates. Under these conditions, indeed, the characteristic multiplier coefficients $c5$ and $c7$ of $AM_{Compr}$ may be considered equal to zero, and the speed of supercharger 14 is estimated by means of the following simplified formula:

$$N = f(\beta, AM_{Compr})$$
$$= c2*(\beta - c1)^{c3} + (c4*\beta)$$

According to a variant, the adaptation of the characteristic coefficients $c1$-$c8$ of the adaptive model may be also made by resorting to an error minimization method implemented by the electronic control unit 21 during normal operation. Also in this case, the initial value of the characteristic coefficients $c1$-$c8$ is identified in a preliminary set-up and design step, from the nominal operation feature provided by the manufacturer and/or from experimental off-vehicle engine data.

In order to check the quality of the adaptation, determining a tolerance value $TV_2$ during a preliminary set-up and design step is required. The adaptation will be considered valid if the difference between the adapted value and the starting value (i.e. established by the manufacturer or in engine off-vehicle tests) is lower than the tolerance value $TV_2$ at additional operating points, different from said at least operating points used for learning.

According to a second variant, the adaptive model is based on a neural network. As known, a neural network represents the information interconnection between elements, named artificial neurons, and processes which use a calculation connectionism approach. The neural network is a non-linear adaptive structure per se, which changes its structure according to external or internal information which flow through the network during the step of learning.

In particular, in order to estimate the speed of supercharger 14, a neural network with a very simple structure is used (2 or 3 node layers with 3-4 neurons in total), so that the computing burden for the electronic control unit 21 is not excessive.

The initial training of each characteristic parameter NN of the neural network is made from the operation feature of the manufacturer and/or from experimental data obtained during a preliminary engine off-vehicle testing step and then adapted for each supercharger 14. In particular, the adaptation of each characteristic parameter NN of the neural network during the normal operation of supercharger 14 may be obtained by means of a minimum number of 6-10 measuring points stored in a memory buffer inside the electronic control unit 21 and uniformly distributed in all the operation regions of supercharger 14.

Also in this case, in order to check the quality of the adaptation, determining a tolerance value $TV_3$ during a preliminary set-up and design step is required. The adaptation will be considered valid if the difference between the adapted value and the starting value (i.e. established by the manufacturer or by engine off-vehicle tests) is lower than the tolerance value $TV_3$ in additional operating points different from said 6-10 operating points used for learning.

A further variant includes not using information obtained from a model of the type described above for validating, completely irrespective of the intensity S of the filtered sound signal, the value of the rotation speed of supercharger 14 estimated as a function of the frequency content of said intensity S. In particular, this further variant is advantageously applied if the internal combustion engine 1 is not provided with a flow meter for detecting the air flow rate sucked in by the internal combustion engine 1 or with pressure sensors set up for detecting the output pressure $P_{outC}$ of the supercharger or the atmospheric pressure $P_{atm}$.

Such a variant includes employing the redundancy of information which may be obtained from the frequency content of the intensity S of the filtered sound signal. In particular, as shown in FIG. 4, two traces A and B are provided corresponding to two multiples of the rotation frequency of supercharger 14, each of the two traces A and B being associated with a respective group of blades 28A and 28B of the bladed disc 26.

In this case, the higher amplitude frequencies are sought within the interval of plausible frequencies of the rotation speed of the rotation shaft of the supercharger, and the multiple values of the higher amplitude frequencies are chosen. Once the information satisfying such a criterion has been obtained, the search may continue in a range centered on the previous point, of higher amplitude than the maximum positive or negative speed variation of the turbo-machine over the time considered by the number of samples used for the Fourier transform.

In this case, the method firstly proceeds by identifying the maximum amplitude frequencies in the frequency content of the sound signal generated by the rotation of supercharger 14 shown in FIG. 4 and, secondly, by recognizing the maximum amplitude frequencies which are each other's multiples or submultiples. The rotation speed of supercharger 14 is determined exclusively using the frequencies with maximum amplitude which are each other's multiples or submultiples.

During a preliminary set-up and design step, an interval of plausible frequencies is determined and the maximum amplitude frequencies in the frequency content of the sound signal generated by the rotation of supercharger 14 are exclusively sought within the plausible frequency interval.

According to a first variant, the method then proceeds by calculating the acceleration of supercharger 14 by dividing the difference between the current value of the rotation speed of supercharger 14 and the previous value of the rotation speed of supercharger 14 (i.e. between two values of the rotation speed of supercharger 14, determined in sequence) by the time interval which elapses between the two instants in which the two rotation speeds of the supercharger 14 are determined If the acceleration of supercharger 14 is higher than a maximum value $TV_{acc\_1}$ which has been predetermined in a preliminary set-up step, the electronic control unit 21 generates an error signal.

According to a second variant, instead, the method proceeds by determining a research interval which is centered on the value of the rotation speed of supercharger 14 calculated at the previous implementation step and has a semi-amplitude equal to the maximum possible acceleration multiplied by the time interval which elapses between the instants in which the current value of the rotation speed of supercharger 14 and the previous value of the rotation speeds of supercharger 14 are determined, respectively. The new value of the rotation speed of supercharger 14 is sought by exclusively using the maximum amplitude frequencies which are each other's multiples or submultiples within the research interval.

The above-described control strategies may be also advantageously applied for controlling any other supercharger within the internal combustion engine 1, such as for example a supercharger directly connected to the driving shaft.

Furthermore, the above-described control strategies may be also advantageously applied to controlling a turbocharger of the multistage type. The multistage supercharger usually comprises two or more units connected in cascade to one another; a smaller turbine has a fast response and a low output pressure, while a larger turbine has a response which tends to be slow, but a high output pressure.

The two superchargers 14 apparently have respective rotation speeds which differ from each other, and different frequencies are associated therewith; therefore, by means of a single microphone 25, the noise emitted by both superchargers may be detected and the signal may be broken down into two traces, each of which is associated with a respective supercharger 14.

The strategies described hereto may be advantageously used by the electronic control unit 21 for controlling the rotation speed of supercharger 14 of an internal combustion engine 1 and to implement a series of strategies which are adapted to boost the performance turbocharger 12 as much as possible, while remaining within the structural limit of the turbocharger 12 itself. Moreover, a further advantage is in the computing load of the electronic control unit 21 which is not excessively demanding to implement the above-mentioned strategies.

The invention claimed is:

1. Method for determining a rotation speed of at least one supercharger (14) which compresses a sucked air in an internal combustion engine (1); the determination method, during a normal operation of the internal combustion engine (1), comprises the steps of:
    detecting, by means of a microphone (25), an intensity of a sound signal generated by the rotation of the supercharger (14); and;
    determining an evolution in time of a frequency content of the sound signal generated by the rotation of the supercharger (14);
    the determination method is wherein it comprises the further steps of:
    acquiring, in a preliminary setting-up and design phase, the nominal operation characteristic of the supercharger (14) which provides the rotation speed of the supercharger according to a compression ratio ($\beta$) and to a flow rate ($AM_{Compr}$) of air running through the supercharger (14);
    determining, completely irrespective of the sound signal generated by the rotation of the supercharger (14), a first estimation of the rotation speed of the supercharger (14) according to the compression ratio ($\beta$) between an output pressure ($P_{outC}$) and an input pressure ($P_{inC}$), which is calculated according to an atmospheric pressure value ($P_{atm}$) and to the flow rate of the air sucked by the internal combustion engine (1), according to the flow rate ($AM_{Compr}$) of air running through the supercharger (14), preferably corrected according to an air temperature ($T_{air}$), and using the nominal operation characteristic of the supercharger (14);
    determining an interval of plausible frequencies of the rotation speed of the supercharger (14) based on the first estimation of the rotation speed of the supercharger (14);
    determining a second estimation of the rotation speed of the supercharger (14) according to the frequency content of the sound signal generated by the rotation of the supercharger (14) within the interval of plausible frequencies; and
    validating the second estimation of the rotation speed of the supercharger (14) by means of the first estimation of the rotation speed of the supercharger (14).

2. Method according to claim 1, wherein the step of determining the first estimation of the rotation speed of the supercharger (14) comprises, in a preliminary setting-up and design phase, the further steps of:
    determining, by using the nominal operation characteristic of the supercharger (14), a model for estimating the rotation speed of the supercharger which provides the rotation speed of the supercharger according to the compression ratio ($\beta$) and to the flow rate ($AM_{Compr}$) of air running through the supercharger (14); and
    determining the first estimation of the rotation speed of the supercharger (14) according to the compression ratio ($\beta$) and to the flow rate ($AM_{Compr}$) of air running through the supercharger (14) and using the estimation model.

3. Method according to claim 2 and comprising the further step of updating the estimation model using the second estimation of the rotation speed of the supercharger (14) when the second estimation has been validated by the first estimation.

4. Method according claim 2, wherein the estimation model consists of a non-linear equation which is a function of the compression ratio ($\beta$) between the output pressure ($P_{outC}$)

and the input pressure ($P_{inC}$) of the supercharger (14), of the flow rate ($AM_{Compr}$) of air running through the supercharger (14) and of a plurality of characteristic parameters (c1-c8) of the estimation model.

5. Method according to claim 4, wherein the estimation model consists of the following non-linear equation:

$$N=c2*(\beta-c1)^{c3}+(c4*\beta)+(c5*AM_{Compr}{}^{c6})+(AM_{Compr}/\beta)^{c8}/c7$$

wherein:
N rotation speed of the supercharger (14);
β compression ratio:
$AM_{Compr}$ air flow rate;
c1-c8 characteristic parameters of the estimation model.

6. Method according to claim 4 and comprising the further step of updating the value of only a part of the characteristic parameters (c1-c8) of the estimation model using the second estimation of the rotation speed of the supercharger (14) when the second estimation has been validated by the first estimation.

7. Method according to claim 4 and comprising the further step of calculating a starting value of a plurality of characteristic parameters (c1-c8; NN) of the estimation model through the nominal operation characteristic of the supercharger (14).

8. Method according to claim 7 and comprising the further steps of:
calculating an updated value of the characteristic parameters (c1-c8; NN) of the estimation model using the second estimation;
calculating the difference between the current value of each characteristic parameter (c1-c8; NN) of the estimation model and the corresponding updated value; and
updating the current value of each characteristic parameter (c1-c8; NN) of the estimation model using the corresponding updated value when the absolute value of the difference is lower than a tolerance value ($TV_1$).

9. Method according claim 2, wherein the estimation model consists of a neural network preferably consisting of 2 or 3 node layers with 3 or 4 artificial neurons.

10. Method according to claim 2, and comprising the further step of updating the nominal operation characteristic of the supercharger (14) using the second estimation of the rotation speed of the supercharger (14) when the second estimation has been validated by the first estimation and when the intensity of the sound signal used to determine the second estimation is higher than a first threshold value.

11. Method according claim 1 and comprising the further step of diagnosing a malfunction of the microphone (25) when the absolute value of the difference between the second estimation and the first estimation of the rotation speed of the supercharger (14) remains higher than a second threshold value for a time interval which is longer than a third threshold value.

12. Method according to claim 1, wherein the internal combustion engine (1) comprises at least two compression stages of the air sucked in, each provided with a respective supercharger (14); the method comprises the further steps of:
detecting, by means of the microphone (25), the intensity of a sound signal generated by the rotation of both superchargers (14);
determining the evolution in time of the frequency content of the sound signal generated by the rotation of both superchargers (14);
determining a second estimation of the rotation speed of each supercharger (14) according to the frequency content of the sound signal generated by the rotation of both superchargers (14);
determining, completely irrespective of the sound signal generated by the rotation of the supercharger (14), a first estimation of the rotation speed of each supercharger (14); and
validating the second estimation of the rotation speed of each supercharger (14) by means of the first estimation of the rotation speed of the supercharger (14) itself.

13. Method for determining a rotation speed of at least one supercharger (14) which compresses a sucked air in an internal combustion engine (1); the determination method, during a normal operation of the internal combustion engine (1), comprises the steps of:
detecting, by means of a microphone (25), an intensity of a sound signal generated by the rotation of the supercharger (14); and;
determining an evolution in time of a frequency content of the sound signal generated by the rotation of the supercharger (14);
the determination method is wherein it comprises the further steps of:
determining, completely irrespective of the sound signal generated by the rotation of the supercharger (14), a first estimation of the rotation speed of the supercharger (14), based on which an interval of plausible frequencies of the rotation speed of the supercharger (14) is determined;
determining a second estimation of the rotation speed of the supercharger (14) according to the frequency content of the sound signal generated by the rotation of the supercharger (14) within the interval of plausible frequencies;
validating the second estimation of the rotation speed of the supercharger (14) by means of the first estimation of the rotation speed of the supercharger (14); and
diagnosing a malfunction of the microphone (25) when an absolute value of a difference between the second estimation and the first estimation of the rotation speed of the supercharger (14) remains higher than a second threshold value for a time interval which is longer than a third threshold value.

14. Method according to claim 13, wherein the step of determining the first estimation of the rotation speed of the supercharger (14) comprises, in a preliminary setting-up and design phase, the further steps of:
acquiring the nominal operation characteristic of the supercharger (14) which provides the rotation speed of the supercharger according to a compression ratio (β) and to a flow rate ($AM_{Compr}$) of air running through the supercharger (14); and
determining the first estimation of the rotation speed of the supercharger (14) according to the compression ratio (β) between an output pressure ($P_{outC}$) and an input pressure ($P_{inC}$), which is calculated according to an atmospheric pressure value ($P_{atm}$) and to the flow rate of the air sucked by the internal combustion engine (1), according to the flow rate ($AM_{Compr}$) of air running through the supercharger (14), preferably corrected according to an air temperature ($T_{air}$), and using the nominal operation characteristic of the supercharger (14).

15. Method according to claim 14, wherein the step of determining the first estimation of the rotation speed of the supercharger (14) comprises, in a preliminary setting-up and design phase, the further steps of:
determining, by using the nominal operation characteristic of the supercharger (14), a model for estimating the rotation speed of the supercharger which provides the rotation speed of the supercharger according to the compression ratio (β) and to the flow rate ($AM_{Compr}$) of air running through the supercharger (14); and determining the first estimation of the rotation speed of the supercharger (14) according to the compression ratio (β) and to the flow rate ($AM_{Compr}$) of air running through the supercharger (14) and using the estimation model.

16. Method according to claim 15 and comprising the further step of updating the estimation model using the second estimation of the rotation speed of the supercharger (14) when the second estimation has been validated by the first estimation.

17. Method according to claim 16, and comprising the further step of updating the nominal operation characteristic of the supercharger (14) using the second estimation of the rotation speed of the supercharger (14) when the second estimation has been validated by the first estimation and when the intensity of the sound signal used to determine the second estimation is higher than a first threshold value.

18. Method according claim 15, wherein the estimation model consists of a non-linear equation which is a function of the compression ratio (β) between the output pressure ($P_{outC}$) and the input pressure ($P_{inC}$) of the supercharger (14), of the flow rate ($AM_{Compr}$) of air running through the supercharger (14) and of a plurality of characteristic parameters (c1-c8) of the estimation model.

19. Method according to claim 18, wherein the estimation model consists of the following non-linear equation:

$$N = c2*(\beta-c1)^{c3} + (c4*\beta) + (c5*AM_{Compr}^{c6}) + (AM_{Compr}/\beta)^{c8}/c7$$

wherein:
N rotation speed of the supercharger (14);
β compression ratio;
$AM_{Compr}$ air flow rate;
c1-c8 characteristic parameters of the estimation model.

20. Method according to claim 18 and comprising the further step of updating the value of only a part of the characteristic parameters (c1-c8) of the estimation model using the second estimation of the rotation speed of the supercharger (14) when the second estimation has been validated by the first estimation.

21. Method according to claim 18 and comprising the further step of calculating a starting value of a plurality of characteristic parameters (c1-c8; NN) of the estimation model through the nominal operation characteristic of the supercharger (14).

22. Method according to claim 21 and comprising the further steps of:
calculating an updated value of the characteristic parameters (c1-c8; NN) of the estimation model using the second estimation;
calculating the difference between the current value of each characteristic parameter (c1-c8; NN) of the estimation model and the corresponding updated value; and
updating the current value of each characteristic parameter (c1-c8; NN) of the estimation model using the corresponding updated value when the absolute value of the difference is lower than a tolerance value ($TV_1$).

23. Method according claim 15, wherein the estimation model consists of a neural network preferably consisting of 2 or 3 node layers with 3 or 4 artificial neurons.

24. Method according to claim 13, wherein the internal combustion engine (1) comprises at least two compression stages of the air sucked in, each provided with a respective supercharger (14); the method comprises the further steps of:
detecting, by means of the microphone (25), the intensity of a sound signal generated by the rotation of both superchargers (14);
determining the evolution in time of the frequency content of the sound signal generated by the rotation of both superchargers (14);
determining a second estimation of the rotation speed of each supercharger (14) according to the frequency content of the sound signal generated by the rotation of both superchargers (14);
determining, completely irrespective of the sound signal generated by the rotation of the supercharger (14), a first estimation of the rotation speed of each supercharger (14); and
validating the second estimation of the rotation speed of each supercharger (14) by means of the first estimation of the rotation speed of the supercharger (14) itself.

\* \* \* \* \*